Sept. 8, 1942.  P. V. PALMQUIST  2,294,930
REFLEX LIGHT REFLECTOR
Filed April 7, 1941  3 Sheets-Sheet 1

Inventor
Philip V. Palmquist
By Paul Carpenter
Attorney

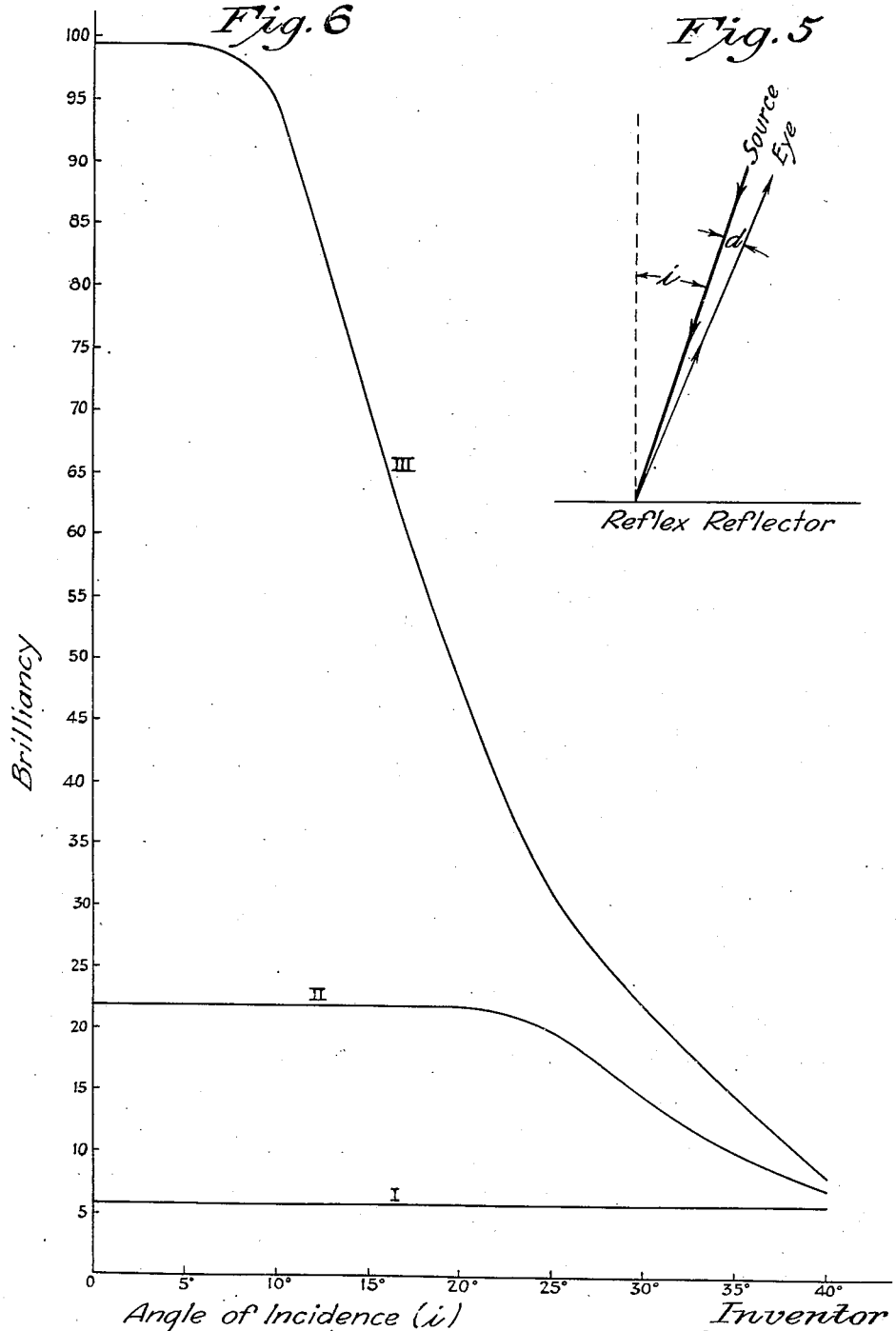

Sept. 8, 1942.                P. V. PALMQUIST                2,294,930
                           REFLEX LIGHT REFLECTOR
                          Filed April 7, 1941            3 Sheets-Sheet 3
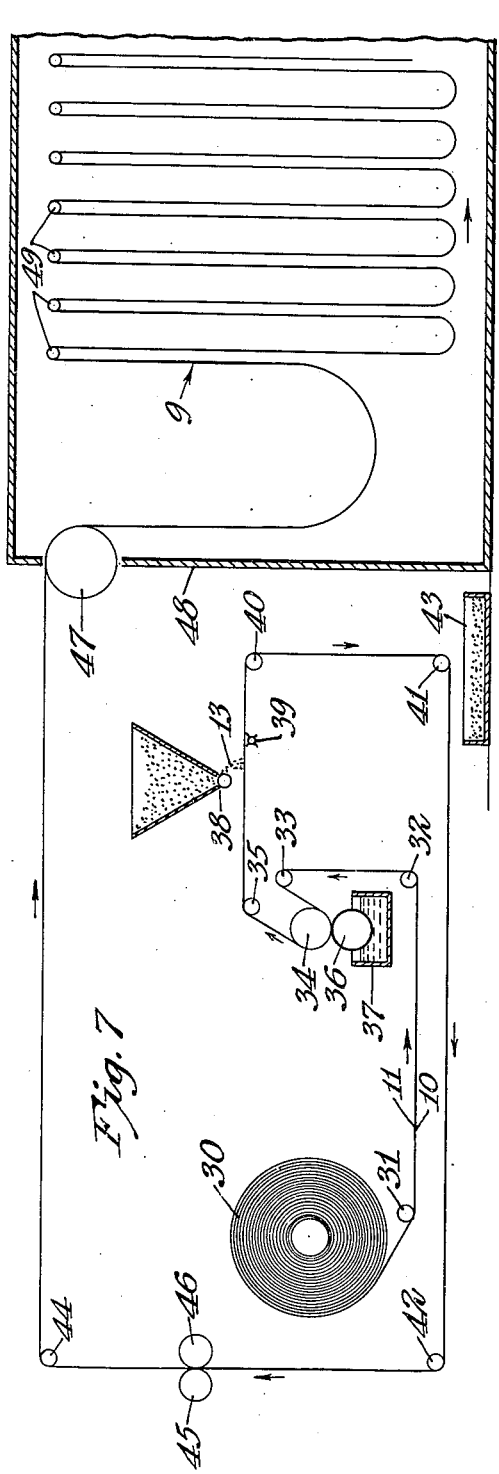
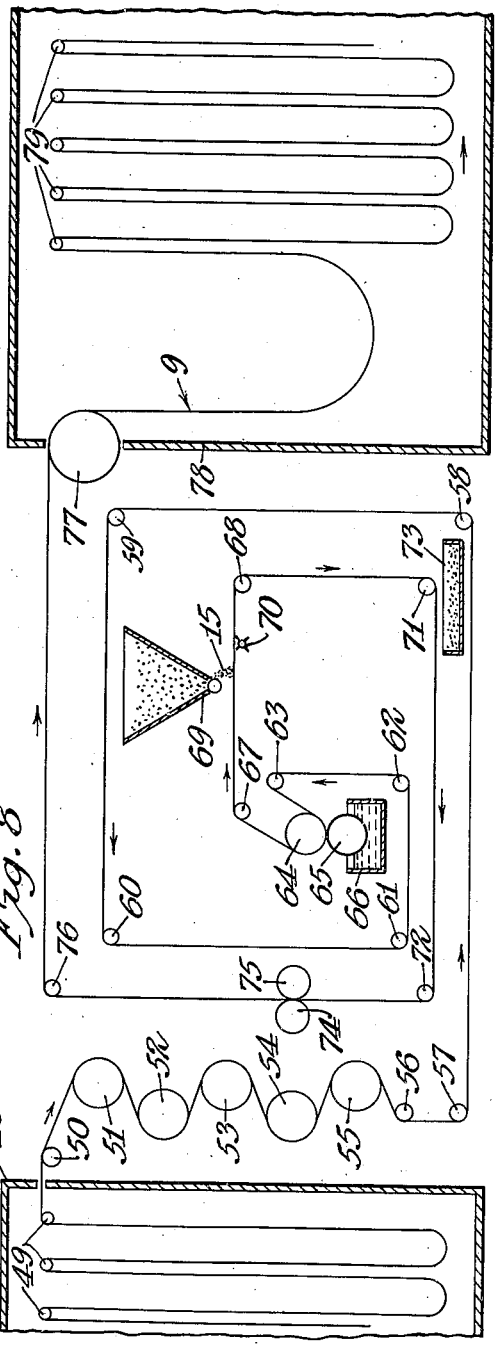
Inventor
Philip V. Palmquist
By Paul Carpenter
Attorney Patented Sept. 8, 1942

2,294,930

UNITED STATES PATENT OFFICE 2,294,930

REFLEX LIGHT REFLECTOR

Philip V. Palmquist, Minneapolis, Minn., assignor to Minnesota Mining & Manufacturing Company, St. Paul, Minn., a corporation of Delaware Application April 7, 1941, Serial No. 387,282

15 Claims. (Cl. 88—82)

This invention relates to reflex light reflectors of the class in which a light-returning layer of contiguous small transparent glass beads or spheres is partially embedded in a bonding layer, with light-reflecting means being located behind the beads, so that an incident beam or ray of light is refracted and reflected in such manner that a brilliant cone of light is selectively returned toward the source, even though the incident light strikes at an angle (see Fig. 4). The characteristic of such a reflector in returning back a brilliant cone of light toward the source of an angularly incident ray, gives rise to the term "reflex" reflector, to distinguish from mirrors which cause specular reflection, and from diffusing surfaces which dissipate the incident light in all directions without selective return in the direction of incidence. Where light is reflexively reflected, with proper control of various factors hereinafter discussed in detail, an observer located near the axis of incident light will be able to see the reflected light at far greater distance than would be the case if diffuse reflection occurs. Road signs of the reflex type have greater visibility at night than ordinary signs. This broad principle is now well known and has been employed not only in signs and markers of various kinds, but also in moving picture screens intended for use in long, narrow theatres.

The present invention is concerned with an improved type of this class or reflex reflectors, and aims to provide a reflex reflector of greatly improved brilliancy especially adapted to the making of highway signs, markers, and advertising displays, which will be visible at far greater distance than glass bead reflectors previously known, but without undue sacrifice of other necessary characteristics.

An embodiment of the present type of construction involves a spacing away of the layer of small beads from a flat reflecting rear surface, with the beads being embedded in a transparent matrix which contains a multiplicity of transparent spacing elements adapted to produce, in positive mechanical fashion, the desired degree of spacing. A feature of the present invention is that provision is made for the selective spacing of beads of different size so that beads are spaced from the reflecting surface in proportion to their individual diameters. This is important since beads are not manufactured with identical diameters, and an aggregate of beads will, even after screen grading, be composed of beads of various diameters.

Although not limited thereto, an object is to provide flexible, weatherproof reflex reflector sheets adapted to be readily cut to desired shape and adhesively united to any desired base or backing. This permits the user to make his own signs without special equipment and, of particular importance, it permits the user to convert ordinary signs into the improved reflex type. The nature of the invention permits such sheet material to be conveniently manufactured in continuous web fashion and supplied in rolls of any reasonable width and length, thus reducing manufacturing costs and making for convenience in shipping and storage, and economies of use since the user may cut shapes of a wide variety of sizes from a stock roll.

Thus highway and traffic authorities may utilize the ordinary enameled highway and traffic signs and markers which are already in use, and at small expense cut and affix thereto the present reflex reflector sheet material either as letters, numerals or other indicia, superposed over those of the sign, or such sheet material may be cut out and applied to form a reflecting border or background, the apertures in the sheet conforming to the letters, numerals, or other indicia of the sign. Or, as in the case of a sign having embossed, raised, indicia, the sheet may be applied entirely over the sign, conforming to the surface contours, and the raised portions blacked out by running a roller coated with ink or paint over the sign. Considering the large number of signs used in even a relatively small city, it is evident that cost considerations are important and that a reduction in cost of providing weatherproof reflex type signs will make possible the use of such signs on a large scale. The toll of traffic injuries and deaths is so enormous that any economically feasible means of reducing it is clearly of the greatest importance to the public, while saving of expense is obviously a direct benefit to the taxpayers.

Various other objects and features of the invention will be evident from the following description.

At the outset it is well to emphasize the fact that it is by no means a simple matter to construct brilliant reflex reflectors of the class described, particularly because of the number of different factors involved. While the broad optical principle of securing reflex reflection through use of beaded surfaces is old and well known, the published prior art reveals little in the way of detailed recognition or analysis of the many points involved and many descriptions are misleading.

In the accompanying illustrative drawings:

Fig. 5 is a diagram used in illustrating the nature of the reflex reflection obtained;

Fig. 6 is a graph showing the variation of reflex reflection brilliance for various angles of incident light, as to three types of reflex reflectors; and Figs. 7 and 8 are flow sheet diagrams illustrative of a method and means for manufacturing continuous webs of reflex reflector sheeting made in accordance with this invention.

Figure 1:
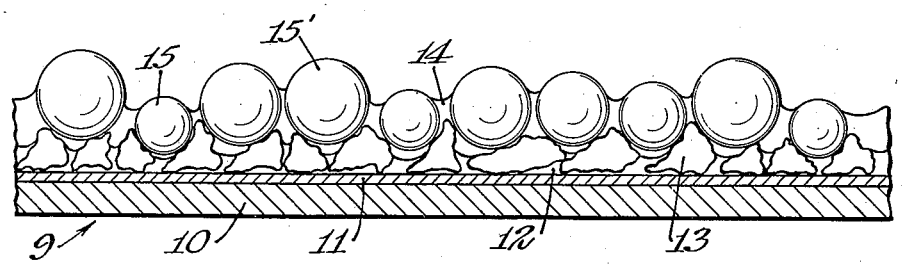
Figs. 1 and 2 are diagrams indicating, in magnified form, sections of reflex reflectors and the manner of spacing the layer of reflexive (light-returning) glass beads so as to secure selective spacing.

Referring to Fig. 1, an illustrative embodiment 9 is shown having a base or backing 10 provided with a continuous flat reflector layer or surface 11, the latter coated with a transparent space coat 12 in which are partially embedded a multiplicity of contiguous, finely divided, graded, glass cullet particles 13 serving as a layer of transparent spacing elements. These latter are covered over with a transparent bead bonding coat 14 in which are partially embedded a multiplicity of contiguous, small, graded, transparent glass spheres or beads 15, which are of variable size and are nested against the spacing elements so as to be wedged between and against adjacent spacing particles so as to be positively and mechanically positioned away from the under-lying reflector surface, forming a spaced reflexive (light-returning) layer. Coatings 12 and 14 (which may or may not have the same composition) thus constitute the transparent matrix for the beads and cullet.

The glass beads or spheres 15 are embedded so that somewhat less than half the surface is exposed, thus being held firmly in sockets provided by the bead bonding coat 14. Owing to capillarity, the bead bonding coat surface is curved between the beads, that is, rises higher upon the beads than the surface midway between adjacent beads. The exposed surfaces of the beads provide a multiplicity of contiguous convex lens elements. Frosted or etched beads should obviously not be used in this construction, since the surface of such beads would cause diffusion of incident light.

It is impracticable to obtain minute glass spheres which are all of identical diameter. Batches of glass spheres (commonly called "glass beads"), as obtained on the market, contain beads of various diameters, even though a particle size number is ordered. To grade such beads for the selection of beads closely approximating a given diameter would involve the rejection of a large fraction and greatly increase the cost. It is preferable to screen the batch in a less discriminating manner, so as to obtain a graded batch in which the beads (in general) do not vary in size by more than a factor of 2, for example. This is, however, a considerable variation from the standpoint of optimum spacing from the reflector layer, since optimum spacing involves a spacing factor which is a particular fraction of the bead diameter and the spacing distance for optimum results thus depends upon the bead diameter. If the rear extremities of the beads should be uniformly spaced from the reflector surface, the ratio of this spacing distance to bead diameter would vary considerably from bead to bead. Thus if the bead diameters vary by as much as a factor of 2, the spacing factors for the various beads will also vary by a factor of 2 (with uniform spacing), so that only a fraction of the beads can closely approach optimum spacing.

Referring to Fig. 1, the selective spacing principle of the present invention is clearly illustrated. The diagram is not a true section, but is drawn so that the true diameter of each bead will be shown. (In actual practice, of course, a single section plane would not pass through the center of each bead in a series, since the beads are packed and are not arranged in rows.) The reflexive beads 15, in settling between the cullet particles 13, come to rest at different distances from the reflector surface 11, the smaller beads (in general) being more closely spaced than the larger beads. This results in part from the fact that when the beads are sprinkled upon the sheet during manufacture, with subsequent agitation of the beads and sheet, the smaller beads tend to catch in the larger interstices between the cullet particles and to be worked in farther than is the case with the larger beads. Also, the smaller the bead diameter, the farther it will pass between any given spaced restraints (which can be illustrated by the fact that a small hoop can be pushed farther between a pair of spaced rods than a large hoop can be). This selective spacing is illustrated in Fig. 1 (compare, for example, the beads marked 15 and 15').

It is rather remarkable that this simple and apparently crude expedient can produce effective selective spacing, resulting in an optimum condition closely approaching what would be obtained by using spheres of substantially identical diameters which are identically spaced. Yet such is the case, as has been verified by experiments in which reflection efficiencies were compared. This discovery, the result of which could not be predicted in advance, is an important feature of the invention.

Best results are obtained when properly graded glass cullet is used to provide the spacing elements. Grading of a batch of crushed glass serves to eliminate most of the slivers and to obtain cullet particles which fall within a proper range of size in relation to the refractive index and range of size of the beads which are used. For glass beads of say 1.53 refractive index, the beads should be spaced a distance of approximately one-third the bead diameter. These points will be discussed in greater detail later on.

Referring again to Fig. 1, the space coat 12, spacing elements (cullet) 13, and the bead bonding coat 14, should have indices of refraction which are substantially identical, in order to provide a medium between the beads 15 and the reflector 11 which is substantially optically homogeneous (in a refractive sense), thus minimizing the scattering of light. Considering these together as constituting a homogeneous embedding and spacing medium between the beads and the reflector, there are three possibilities—(a) the medium may have an index of refraction substantially identical with that of the beads, in which case no refraction will occur between the exposed bead surfaces and the reflector surface; or (b) the medium may have a substantially lower index of refraction, or (c) a substantially higher index of refraction. In the last two cases, refraction will occur at the boundary between bead and embedding medium, and a compound lens effect will be obtained. The varying results will be discussed later. From a practical standpoint, case (a) is preferred (all components having the same refractive index), because of simplicity and cheapness. In this case, the reflector 11 may be regarded as surmounted by a multiplicity of small convex-plano lens elements.

Figure 2:
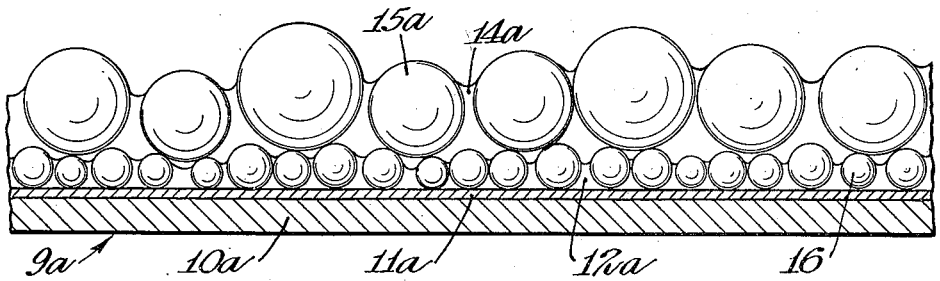

Referring to Fig. 2, a variant form of construction 9a is shown in which the base or backing 10a, reflector 11a, space coat 12a, bead bonding coat 14a and beads 15a may be the same as the elements designated by the same numerals in Fig. 1. But here transparent glass spheres 16, graded and of variable size, and of smaller diameter than the exposed reflex beads 15a, are employed as spacing elements in place of the irregular cullet particles 13 of Fig. 1. These spacing beads serve the same purpose and likewise produce selective spacing of the exposed reflex beads.

Figures 3, 4:
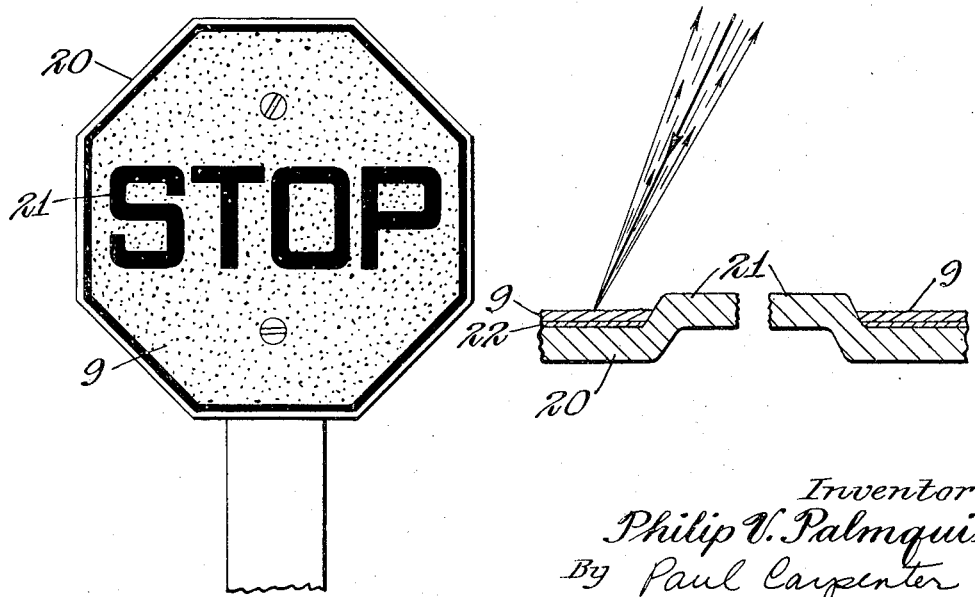
Figs. 3 and 4 are plan and sectional views, respectively, of a "stop sign" provided with a reflexive background formed of reflex reflector sheet material.

Fig. 3 shows a highway "stop" sign illustrating a use of the reflex reflector sheeting, and Fig. 4 shows a section of such a sign in magnified diagrammatic fashion. The base of this sign is a regular embossed and enamelled stiff metal sign 20 and may be one which is already in use. This has black lettering raised above the background level by embossing as indicated by reference numeral 21.

A piece of the reflex reflector sheet 9 is cut to size to fit within the raised marginal border of the sign and has apertures cut therein corresponding to the raised lettering (or other indicia). It is then bonded to the sign, as by means of a cement layer 22. The raised lettering or other indicia project through the apertures and are as visible as before. The reflex reflector sheet forms a background surface and this reflex reflecting part of the sign will be visible at a great distance at night to drivers of approaching vehicles whose lights provide illumination. At first only the general glow will be seen, but this will warn that a sign is being approached; then the letters or indicia will be seen as dark areas against the bright background; and finally the enameled surfaces of the letters will be seen.

With a reflector sheet of sufficient thinness and flexibility, it may simply be placed over the sign base without cutting of apertures and be pressed to conform to the embossings. The raised portions of the reflector sheet may be "blacked out," by printing or coating the raised beaded areas with a black or colored ink or paint, to provide lettering or other indicia visible as in an ordinary sign, with a reflex reflecting surrounding background.

The reflex reflector sheeting may of course be cut into letters, numerals, arrows, or other indicia, and these may be adhesively united to any desired base. Reflector sheeting of contrasting color may be used as a background. Thus a white reflector sheet may be applied to the sign base, and indicia cut from colored type reflector sheeting may be bonded to the surface of the base reflector sheet. Various colors are obtained by using tinted glass or coats or, preferably, by using colored pigments to provide the reflecting surface underlying the beads. Thus in Fig. 1, the reflector 11 may be a colored pigmented layer, or use may be made of a white pigment to provide white reflection.

Reference is now made to Fig. 5 which is a diagram used to illustrate certain optical factors involved in reflex reflectors as a class. A ray or pencil of rays is shown coming from a distant source and impinging upon the reflex reflector with an angle of incidence $i$ (the angle between an incident ray and the normal). If a mirror were used, producing specular reflection, the emergent or reflected rays would leave the reflector at the same angle but on the other side of the normal. If a diffusing surface were used, emergent or reflected rays would go off indiscriminately in all directions and only a small fraction would return toward the source. However, with reflex reflection, there is a collimation by the lens elements and a cone of brilliant light is returned toward the source, the axis of the cone being substantially the same as the axis of the incident ray or pencil of rays. By "cone of brilliant light," it is meant that the intensity of light within the cone is greater than would be the case where diffuse reflection occurs. This may hold true only where the angle of incidence $i$ does not exceed a certain value, depending upon the particular type of reflex reflector which is used.

If we consider only the brilliance of the returned light within a narrow cone (say one which embraces light rays deviating no more than about 10' from the axis of the incident ray or incident pencil of rays) and compare its intensity for various angles of incidence, it will be found that the intensity decreases as the angle of incidence increases. With some types of reflex reflectors the drop occurs rapidly, while with others there is very little drop until a large angle of incidence occurs. A reflex reflector is said to have "good angularity" when there is no great drop off of intensity for angles of incidence less than a substantial value. But the value of the reflex reflector also depends upon reflectivity or intrinsic reflecting efficiency, since good angularity may be more than offset by the fact that even the maximum brilliancy (when $i=0°$) may be poor, due to excessive diffusion of light.

This brings us to a third factor which results from the fact that the eye of the observer is seldom on the axis of incident light. Thus in the case of an automobile approaching a highway sign, there will be angle between any given ray of incident light (approaching the sign from the headlights) and the reflected rays reaching the driver's eyes. Hence if the reflex reflector is perfect in directional action, with incident light being returned only to its source, it would have little or no utility in the sign field. There should be a coning out of reflexive light rays in order that persons near but off the axis of incident light may take advantage of the reflex characteristic of the reflector or sign, but this coning out should not be excessive or the reflectivity will suffer through diffusion of light outside the useful range. The coning out results from the deviation of emergent rays from the axis of incident light. The deviation of a particular ray is illustrated in Fig. 5, and the "deviation" as regards a ray reaching the observer's eye may be defined as the acute angle between the incident ray and the emergent ray, designated as angle $d$.

Referring now to the Fig. 6 graph, the curves show how the reflexive brilliancy varies with the angle of incidence, for three different forms of reflex reflector construction, and also show the variation in intrinsic reflectivity or brilliancy as between these forms. In each construction graded small glass beads were used, of the order of 5-10 mils diameter.

Measurements were made with a photometer designed to measure the intensity of a cone of reflected light having the same axis as the incident light, the cone embracing light rays deviating no more than approximately 10' (0.17°) from the axis. Comparison was made with light received from a standard lamp, the distance of which was varied until light from both sources was observed to be of the same intensity, the intensity from the standard lamp varying inversely as the square of the distance. The reflexive brilliances of the various reflex reflectors, for various angles of incidence, could then be plotted to scale, as shown.

Curve I shows the results for an old type of reflex reflector in which glass beads are directly embedded in a white pigmented binder, to about half their depth, with reflection of incident rays occurring internally within the beads at the boundary of bead surface to binder. Beads of 1.53 refractive index were used. In this case there is no spacing between beads and reflector surface, the reflector surface, as to each bead, being hemispherical, concave, and in direct contact with the rear surface of the bead. It will be seen that the brilliancy is low in comparison with the other curves, and that the curve is essentially flat for incident light up to at least a 40° angle of incidence. Such reflex reflector therefore has high angularity but poor brilliancy, that is, brilliancy has been sacrificed to obtain high angularity.

Curve II shows the results for a reflex reflector of the type shown in Fig. 1, the glass beads and cullet, and the space and binder coats, having an index of refraction of 1.53. The spaced reflector surface 11 was formed of a white pigmented coating upon the base 10, causing diffuse reflection of light incident thereon, the collimating action of the spaced beads serving however to direct a brilliant cone of light back to the source. It will be seen that increased brilliancy has been obtained, that there is substantially no dropping off for angles of incidence up to about 20°, and that thereafter there is a gradual dropping off but the brilliancy even for 40° incidence is still higher than in the case of the curve I reflector. For angles up to about 20°, this reflex reflector is at least 3 times as brilliant as in the prior art form in which beads are embedded in a pigmented binder. The angularity characteristic is fully ample for highway signs and the like.

Curve III shows the results for a construction which is the same except that reflector coating 11 is an aluminum paint type, the surface being formed of minute aluminum flakes most of which are approximately parallel to the surface. Such a reflector surface provides semi-specular metallic reflection of light incident thereon. As a result there is much greater brilliancy but a more rapid dropping off as the angle of incidence increases. At angles up to about 5°, the brilliancy is about 4 times as great as for the curve II form and about 14 times as great as for the prior art type of curve I. Even for a 30° angle of incidence the brilliancy is at least about 3 times as great as for the curve I type, and remains greater up to at least about 40°.

Even greater brilliancy can be obtained by using an aluminum foil to provide the reflector 11, a brilliancy of about 250° for zero angle of incidence having been measured, using the same scale as was used for the previous cases. The curve in such a case falls off more steeply but is still considerably higher than the other curves up to a substantial angle. This results from the fact that the foil surface provides a reflector surface more nearly approaching true specular. Finally, by using a mirror reflector, giving specular reflection, even greater brilliancy can be obtained, with some further sacrifice of angularity.

Thus Fig. 6 shows in a striking manner the superiority of the present type of reflex reflector, for angles of incidence less than 40°, over the prior art form in which the beads are embedded in a pigmented binder. The angularity characteristic is adequate for highway signs and there is no need to sacrifice brilliancy to obtain better angularity.

It should also be mentioned that in each of the foregoing cases there is sufficient angularity and coning out of returning light rays so that, for example, a driver approaching a stop sign set near the edge of the road will see it by reflexive light up to a sufficient point.

The optical characteristics responsible for utility will now be restated in the form of separate factors, viz:

(A) *Brilliancy*.—This term signifies the intrinsic efficiency of reflex reflectivity. This factor may be isolated by comparing various forms of construction on the basis of brilliancies at 0° angle of incidence. Thus in the Fig. 6 graph, the brilliancy values at 0° provide a basis for comparing efficiency of reflection.

(B) *Angularity*.—This term signifies the ability of a reflex reflector to maintain brilliancy at increasing angles of incidence, i. e. the steeper the curve (Fig. 6) the poorer the angularity. Poor angularity may, however, be more than offset by high brilliancy within the range of angles of incidence which is sufficient for the particular use. Reflex reflectors may be compared upon the basis of the angles of incidence at which the intensity has dropped to a specified percentage of that at 0° incidence. This angle may be called the "angularity index". Thus if 80% is taken, the index for the curve II type is about 27°, and for the curve III type is about 13°.

(C) *Divergency*.—This term signifies the extent of coning out, or deviation, of reflexive emergent light from the axis of incident light. Good divergency occurs where there is sufficient coning out to insure the observer seeing brilliant light, but not sufficent to wastefully dissipate light outside the field of viewing and thus needlessly sacrifice brilliancy. A practical criterion of relative divergency may be based upon the angle of deviation $d$ (see Fig. 5) which may be reached before an observer notices a marked drop in brilliancy. This angle may be termed the "divergency index." For the curve II type of reflector this angle is about 1.1° and for the curve III type of reflector it is about 0.7°. The test may conveniently be made by an observer standing say 50 yards from the reflector and moving a flashlight downward from eye level until a marked drop-off in observed brilliancy occurs. The point is fairly critical and can be easily detected, especially if the light is moved rapidly and is not too intense. From this point on there is a steady and gradual decrease of brilliancy. These angles may seem small but it should be borne in mind that in the case of a car approaching from a distance, the deviation between incident light and light reaching the driver's eyes will amount to less than 0.7° until the car is within about 250 feet from the reflex sign or other indicia, and that the closeness of headlamps and driver to the sign, as it is approached, increases the intensity of light reaching the driver's eyes to compensate for the loss due to the increased deviation. The small divergency index shows the concentration of emergent light about the axis of incident light which makes reflex indicia visible when the car is a great distance away.

Curves II and III of Fig. 6 were obtained from reflex reflectors of the Fig. 1 type wherein substantially optimum spacing was used. The reflection characteristics can be varied by control of the spacing factor. It is found that there is a range of spacing within which the brilliancy is at an optimum with little variation, that is, there is no marked drop in brilliancy when the spacing is within this range. This range is greatest where a diffusing reflector surface is used, and becomes progressively narrower and more critical as approach is made to a specular type reflector. Within this range, the shorter the spacing between beads and reflector, the greater the angularity and divergency. Hence, in general, it is desirable to employ the least spacing which can be obtained without appreciable sacrifice of brilliancy. However, if greater angularity and divergency are desired, even with a sacrifice of brilliancy, the spacing may be decreased further. Increase of spacing beyond that which gives optimum brilliancy causes not only a loss of brilliancy but also makes for poorer angularity, and hence the spacing should be kept substantially less than the bead diameter.

The optimum spacing for a glass sphere of 1.50–1.55 index of refraction is approximately one-third the bead diameter when the glass sphere and the medium separating it from the reflecting surface both have the same index of refraction. The optimum spacing will be less or greater if the medium has an index less or greater, respectively, than that of the glass sphere. The optimum spacing decreases with increase of refractive index of the sphere. An advantage of using a construction in which the spacing is a minimum for optimum results is that there will be less material through which the light travels and hence less light absorption (assuming specific absorption to be the same), and less material is needed; but other complications may offset this advantage, such as the greater difficulty of securing accurate spacing under factory conditions, the problem of having the elements making up the medium between the glass spheres and the reflector surface of the same index to minimize internal scattering of light, and higher material costs which may result (such as where glass of special type is used).

In considering what determines the optimum spacing for a particular glass sphere, it should be pointed out that elementary lens formulas are not applicable. Spherical abberation is very pronounced. Thus considering a pencil of parallel rays striking a sphere of 1.53 index embedded to half its diameter in a transparent medium of the same index, and calculating the spacing of a reflector (perpendicular to the incident rays and behind the inner extremity of the sphere) upon which rays are brought to a focus—for rays striking the sphere at a distance of $\frac{1}{10}$ of its radius from a normal passing through its center, a spacing of 44% of the sphere diameter would be needed, while a spacing of 36% would be needed for rays striking the sphere at a distance of ½ the sphere radius, and even less spacing for rays striking still closer to the margin. But the picture is further complicated by the fact that the focus is shifted laterally for angularly incident rays, upon a sphere concentric with the glass sphere which receives the incident rays, whereas the reflector surface is flat. Hence it is impossible to focus all incident rays upon the reflector surface. That is, for any spacing of the reflector surface from the glass sphere, a pencil of rays striking the glass sphere, whether normally to the reflector or angularly, will not be focussed upon the reflector. There will, however, be a spacing such that optimum brilliancy is secured and, where diffuse reflection occurs upon the reflector surface, there will be a fairly non-critical range of substantial magnitude, as previously pointed out.

To illustrate the effect of spacing, beads of 5–10 mil diameter size and 1.53 index, were coated upon an aluminum foil using a transparent binder of the same index, the beads being about halfembedded and pressed into contact with the metal surface, so that no spacing was involved. This was compared with a spaced construction (like Fig. 1) in which the same kind of beads were used, also with an aluminum foil reflector, adjusted to produce approximately optimum brilliancy. The latter, spaced form, had 22 times the brilliancy of the unspaced form.

With respect to bead size, the upper practical limit in this form of construction is about 50 mils (average) diameter; while the lower practical limit is about 3 mils (average), determined by the need of getting a smooth bead coat with uniform and controlled bonding and spacing. The preferred size is in the range of 4 to 10 mils diameter (average).

Reference has previously been made to the "selective spacing" of the glass spheres or beads, so that the smaller beads are more closely spaced to the reflector and the larger beads more distantly spaced, in order that the spacing distance for each bead would approach the optimum. This term is used in a statistical sense, since each and every bead is not spaced the desired optimum distance from the reflector. What is meant is that the average deviation from optimum spacing is minimized. A considerable fraction of the beads will be at or near optimum spacing, and the greater the deviation the smaller the fraction that deviate to that extent. With proper control it has been found possible to approach the condition which exists when beads of identical diameter are uniformly spaced from a reflector.

As a matter of fact the deviations from optimum spacing which exist, where selective spacing is used, produce desirable results from the standpoint of improving the angularity and divergency characteristics of the reflex reflector as a whole without substantial sacrifice of brilliancy. In practice, the beads are not perfectly spherical and this further improves angularity and divergency, particularly the latter. By making the spacing somewhat less selective, these characteristics can be further improved, but with a sacrifice of brilliancy.

It has been mentioned that "graded" glass spheres or beads are used, since there should not be too great a variation of bead size to permit of effective selective spacing. Furthermore, too great a variation would produce a rough surface, and it is desirable to have a relatively smooth surface. "Graded beads" means beads of various size falling within a limited size range, the bead diameters being of the same order of magnitude and, preferably, the smaller beads having diameters at least equal, in general, to half the diameters of the largest beads. To illustrate this further, reference is made to the size range of the so-called "No. 10" beads mentioned hereinafter in connection with examples. These beads have a diameter of the order of 5 to 9 mils and are screen graded from an aggregate of beads having this approximate size.

A batch of No. 10 beads was analytically graded on a series of silk screens with the result that 100% passed through a screen with 13.0 mils openings, less than 10% was retained on a screen with 9.4 mils openings, approximately 75% was retained on a screen with 6.6 mil openings, approximately 20% was retained on a screen with 4.3 mil openings, and only a trace passed through the latter.

To further illustrate size variation, a sample of 25 beads was taken from a batch of No. 10 beads and the beads were individually measured, with the following result expressed in mils diameter: 4.9, 8.3, 7.4, 7.8, 5.6, 7.5, 7.0, 5.2, 6.3, 8.0, 4.9, 7.2, 7.4, 8.5, 7.3, 7.1, 6.8, 5.7, 6.7, 7.2, 5.9, 5.2, 6.8, 7.5 and 5.2. The average size is 6.7 with a range of 4.9 to 8.5. Sampling should not be done by picking individual beads from a mass as an unduly large proportion of large beads will be obtained.

The spacing elements (beads or cullet) should also be graded. Where spacing beads are used (as in Fig. 2), a size should be chosen to produce the desired spacing in accordance with the principles which have been described. Actual trials should be made as only in this way can optimum results be achieved in factory production with a particular equipment. For example, the degree of spacing is influenced by the closeness of packing of the spacing beads, by the viscosity of coating solutions, etc.

Where cullet (crushed glass) is used (as in Fig. 1), grading is particularly needed because of large size variations in an aggregate of particles, and in order to largely remove slivers and splinters.

To illustrate suitable grading for cullet used for spacing No. 10 beads, the glass in each case having a refractive index of 1.53, I have found that good results can be obtained by using a "grit 150" grade (referring to a grading designation employed in the abrasive industry where there is a similar problem in grading irregular particles).

A batch of "grit 150" cullet was analytically graded on a series of silk screens with the result that 100% passed through a screen with 4.0 mils openings, approximately 50% was retained on a screen with 3.5 mil openings, approximately 50% was retained on a screen with 2.7 mil openings, and only a trace passed through the latter.

The coating weight employed for this cullet was 20–26 grains per 24 square inches of surface. This is specified since the coating weight affects the bead spacing—the cullet particles should more or less hug the reflector and be well packed (see Fig. 1), as distinguished from standing on end or being spread far apart.

Various types of reflector surfaces may be classified as follows with respect to their effects in the present type of reflex reflector construction:

(A) *Specular.*—This signifies that a "mirror" type surface is used. An incident ray is substantially entirely reflected as a ray having an emergent angle equal and opposite to the incident ray. This produces the greatest brilliancy, but the angularity and divergency are poor. Angularity is poor since a ray striking the beaded surface at a substantial angle, and being refracted by a bead so as to strike the reflector at an angle may emerge from the latter in a direction which does not permit of refraction by the same bead, with the result that the ray goes off through an adjacent bead which cannot return it toward the source, or is scattered. The greater the angle of incidence of a pencil of rays upon the beaded surface, the fewer the rays which can return toward the source. Divergency is poor because those rays which do return toward the source tend to return with little deviation from the axis of the incident light. For some purposes, the poor divergency may be an advantage, as where a highly directional reflex reflector is wanted.

(B) *Non-specular.*—This term is used broadly to include those reflectors which could not be called efficient mirrors, due to the fact that all or an appreciable part of the reflection is diffuse. A pigment type surface illustrates an extreme. In this latter case a ray incident at an angle upon the reflector surface emerges as a broad cone of rays. Brilliancy is less because many rays do not emerge from the reflector at an angle permitting return through the glass bead through which transmission to the surface occurred, and cannot be collimated and returned toward the source. But angularity is better because, for rays striking the beaded surface at a substantial angle, there will be more rays emerging from the reflector surface at angles permitting return toward the source. Divergency is better because the various angles of emergent returned rays cause many to deviate substantially from the axis of incident light after refraction by the bead.

The term "non-specular" also includes intermediate types, where there is a combination of specular and diffuse reflection, i. e., the greatest intensity is in a direction equal and opposite to the angle of incidence but a substantial intensity occurs in other directions. An aluminum paint is an example. Aluminum or tin foil more closely approach the true specular type, although still giving enough diffuse reflection to increase angularity and divergency, which may be increased further by roughening or lightly etching the surface. These may be termed "non-specular metallic reflectors." Aluminum or tin, for example, cause "sliver reflection," and thus are further distinguished from mineral pigment reflectors (white or colored).

*Manufacture*

A description will now be given of an illustrative system adapted for factory production of reflex reflector sheeting in the form of continuous, flexible, webs; the construction of which is along the lines shown in Fig. 1, for example. Illustrative forms of materials will be given in subsequent examples, the present description relating to the technique of applying the various coatings and layers to a reflective backing. A web backing is first prepared, as by impregnating paper with a waterproofing composition, to form the base 10, upon one side of which a reflecting surface 11 is provided, as by sizing with a binder containing a pigment or by laminating a metal foil, and this is wound into rolls ready for conversion into reflex reflector sheeting.

Referring now to Fig. 7, a roll 30 of such prepared sheeting, having a backing 10 and reflective surfacing 11, is mounted so that the web is withdrawn with the reflector side facing up. Directional arrows are used to show direction of motion of the web and in all instances are placed on the reflector side of the web, which receives the glass bead.

The web is withdrawn from supply roll 30 and passes around guide rolls 31, 32 and 33 and then down to and around steel roll 34 and back up over guide roll 35. Coating roll 36, which is rubber-covered, is located below roll 34 and dips into a bath 37 of space coat fluid, the web being nipped between rolls 34 and 36 and receiving a coating of fluid brought to its surface by roll 36. These rolls are driven and are set to produce the desired coating weight. It is this space coat fluid which, upon subsequent drying out, provides space coat 12 in the finished product (see Fig. 1), and in which the glass cullet is embedded.

With the space coat still in viscous or fluid state, the web passes under glass cullet sprinkler 38, which has a driven roller receiving the cullet from a hopper and in turning causes the cullet 13 to fall across and upon the web. Cullet is applied in excess so as to insure close packing. The web then passes over a batter 39 which beats the web from underneath and causes the cullet particles to pack and settle into the viscous coating so as to be adhesively held in position, the thickness of the space coating being such that the cullet particles can only be partially embedded (see Fig. 1). The cullet particles settle into desired position against the reflector surface.

The web then passes over guide roll 40 and down to and around guide roll 41 and thence back under the coating apparatus to guide roll 42. In passing down to and around roll 41, surplus cullet, which has not been adhesively held, falls from the surface and is caught by receptacle 43. The web then rises vertically to and around guide roll 44, and in doing so passes between nip rolls 45 and 46, roll 45 being steel and bearing against the cullet, while roll 46 is rubber-covered and bears against the back of the web. A light nip is used, serving to smooth the cullet by removing the few projecting particles which may have become stuck to the tops of other particles or which have not been able to settle between adjacent particles, such projecting particles being forced into the cullet layer.

The web then passes to driven pull drum 47 and thence into oven 48. Drum 47 may be of the vacuum type (having suction holes) to provide proper traction and tensioning. Upon entering the oven, the web is festooned upon racks 49 which move through the oven. The oven treatment dries or sets up the space coat, so that the cullet particles become firmly locked in position. It is not necessary to fully dry or set-up the space coat at this point.

Referring now to Fig. 8, which deals with the application of the glass beads, the web is shown leaving oven 48. It passes over guide roll 50 and then down in and around a series of staggered friction drums 51, 52, 53, 54 and 55 for tensioning and lining up. Rotation of these drums is restrained or braked to provide the desired tensioning effect. The web then passes around guide rolls 56 and 76, across under the coating equipment to guide roll 58, thence up above the coating equipment to and around guide roll 59, thence back over the coating equipment to guide roll 60, thence down to and around guide roll 61, thence back under the coater to guide roll 62 and thence up to and over guide roll 63.

The web then passes down around driven steel roll 64, below which is located rubber-covered driven coating roll 65, which dips into a bath 66 of the bond coat fluid. The rolls are set to give the required coating weight, the fluid covering the exposed cullet and being sufficient so that the subsequently applied beads will be embedded to the proper extent (see Fig. 1), this fluid providing, upon subsequent drying, the bond coat 14.

The coated web then passes up and back to guide roll 67, and thence moves horizontally to guide roll 68. In passing, with the coated side up, it moves under the glass bead sprinkler 69, which covers the surface with an excess of glass beads 15, and thence over batter 70 which jiggles the applied beads and causes them to settle into and be adhesively held by the viscous bond coat fluid, the beads coming to rest against the cullet particles as shown in Fig. 1.

The beaded web then passes down to guide roll 71 and thence horizontally under the coater to guide roll 72, rolls 71 and 72 being located so that the web will pass in between the web which is moving from roll 57 to 58 and the web which is moving from roll 61 to 62. In moving down to and around roll 71, the surplus beads fall free from the surface and may be collected in receptacle 73.

From guide roll 72, the web passes vertically upward between a pair of nip rolls 74 and 75, roll 74 being steel and bearing against the bead surface, and roll 75 being rubber-covered and bearing against the back of the web. A light nip is used, sufficient to overturn twin-beads and to press into the bead layer such beads as may be stuck to the surface of other beads. Thus projections are eliminated. With minute beads, this results in a "smooth" feeling surface, since the outer extremities of the beads vary at most by a few thousandths of an inch. Owing to capillarity, the bond coat fluid rises upon the bead surfaces so as to provide sockets embracing somewhat more than a hemisphere of surface (see Fig. 1).

The web passes over guide roll 76 and thence moves horizontally over the whole coating apparatus to pull drum 77, and passes into oven 78 where it is festooned on racks 79 which move therethrough. In this oven the bead bonding coat is dried and set up and the cullet bonding is also set up. The finished product, after leaving the oven, may then be wound into rolls of desired size (not shown).

If desired, the web after leaving the oven may be coated on the back with an adhesive, which may be protected with a removable liner, so that it will be in ready-to-lay form which does not require the application of adhesive at the time of use. Such adhesive coating may be of the pressure-sensitive type (normally tacky) or may be a solvent and/or heat activated type.

The glass beads and cullet should preferably be thoroughly cleaned prior to coating to facilitate anchorage and insure clean boundary surfaces. As an example, the glass particles may be washed with a hot 5% solution of trisodium phosphate, and rinsed alkali-free with distilled water, followed by drying. This also improves the weatherproofness of the product.

In the making of flexible reflector sheets, the invention contemplates the use of any thin, flexible, water-resistant backing of adequate strength and which will enable the reflector sheet to be readily cut. A fibrous fabric, such as cloth or paper, impregnated with a water proofing or water-resistant material, provides cheapness with good utility. Other illustrative backings are felted or woven fabrics made from vegetable or animal fibres, metal fibres, glass fibres, cellulose derivative fibres, acetylated cellulose fibres, various synthetic fibres, (such as "Nyon"); and acetylated paper, rope paper, parchmentized paper, etc. Non-fibrous backings can be used such as films or foils of metal, cellulose acetate, rubber hydrochloride, plasticized or elasticized polyvinyl acetals (such as "Butvar," which is a polyvinyl butyral), synthetic rubbers, "Nylon," etc. Laminated structures may be used which are comprised of dissimilar fibrous or non-fibrous sheets joined together. If porous, the backing may be impregnated or sized with a flexible sealing medium to impart desirable qualities, such as increased strength, unification of fibres, water-resistance, a smooth surface, etc., as by use of resins, rubber, artificial or synthetic rubbers, drying oils, polymerizable materials, etc., used singly or in combination.

The invention is not limited to the use of such flexible backings. Thus signs and markers, etc., may be made up directly wherein a rigid or semi-rigid metal base is used, having a metallic reflective surface upon which the space coat is directly applied, or precoated with a white or colored enamel serving as the reflector upon which the space coat is applied. The beaded area may be part or all of the base area. Thus an enamelled sign, having areas of different color or having part blacked out with black enamel, may be coated over its entire surface to produce a reflex reflector type sign which will reproduce the underlying design. Or certain areas only may be beaded, such as the background, leaving non-beaded areas exposed, such as the lettering. Thus if a highway sign has black lettering against a white background, and the latter is beaded, the sign will show black lettering against a white background both by day and by night.

It will be evident that the novel construction of beaded type reflex reflectors herein described is not limited to the use of true glass for either the reflex spheres or for the spacing elements (beads or cullet). The term "glass" embraces equivalent transparent solid materials. Quartz may be used. The so-called organic glasses may be used, such as methacrylate resins. Inorganic glass is preferred because of its low cost, stability, weatherproofness and hardness. It will also be evident that the spacing elements may have various shapes and need not necessarily be spheres or the shapes obtained from crushing glass.

The invention has been described with particular reference to the spacing of graded glass spheres of variable size. The principle of using a multiplicity of spacing elements of dimension smaller than the glass spheres, may be used to advantage even where the latter are substantially identical in size (i. e. very finely graded to uniform size). The principle of securing accurate and uniform spacing in a statistical sense applies. That is, even though each and every sphere is not spaced the exact optimum or desired amount, the average deviation will be small for most of the spheres and the net integrated effect for an area containing a multiplicity of spheres will be substantially the same, particularly where fine grading of the spheres is accompanied by a relatively fine grading of the spacing elements. There is a definite feature resulting, namely, that an area in one part of the sheet will have the same optical properties as an area in another part. If spacing of minute spheres of identical size is attempted by using a cast film of transparent material (either precast or cast in situ), such as a film of cellulose acetate, some areas of the reflex reflector sheeting will be less brilliant than others, owing to the practical impossibility of casting the film to a precise caliper throughout. In this connection it should be borne in mind that variations of a few ten-thousandths of an inch from place to place will produce significant variations in brilliancy where spheres of No. 10 size, or the like, are used. But where a multiplicity of minute spacing elements are used, although there may be variations in spacing from bead to bead, the average or integrated effect will be substantially the same over the whole area and give an impression of uniform brilliancy, the observer's eye not detecting variations from bead to bead. This is also important in manufacturing continuous webs of great length, to avoid the necessity of cutting out and discarding substandard portions.

*Example 1*

The following illustrates a paper treatment used in making a flexible sheet backing. Two batches are compounded, to be united before paper treatment, having the following formulae, in parts by weight:

Rubber-resin solution: Parts
Latex crepe _____ 100
Rosin _____ 160
Zinc oxide _____ 100
Beta-naphthol (antioxidant) _____ 1
Oleum spirits _____ 200
  (volatile petroleum hydrocarbon solvent of 306–424° F. boiling range)

Vulcanizer solution:
"Tetrone-A" _____ 3
  (dipentamethylene-thiuram-tetrasulfide)
Latex crepe _____ 3
Oleum spirits _____ 24

The rubber-resin solution is prepared by milling the rubber and zinc oxide for 30 minutes, at about 150–160° F., and the resultant sheet is then taken off the rubber mill and placed in an internal mixer (such as a Baker Perkins Mogul mixer), the heating jacket of which carries steam at 40 lbs. pressure, and which has previously been allowed to warm up. A small proportion of the rosin (say 10–25%) is added to make for lubrication, and the mass is mixed for about 8–10 hours, or until reduced to a semi-fluid consistency, thereby breaking down the rubber and making it more plastic, less elastic and more penetrative. The balance of the rosin is slowly added and mixing is continued for another hour. The beta-naphthol is added, and the steam turned off and cooling water introduced into the heating jacket of the mixer. The oleum spirits is then added with continued mixing for half an hour, or until the mixture is homogeneous. The resulting solution may then be drawn off and stored until use.

The vulcanizer solution is prepared by milling together the "Tetrone-A" and rubber and dissolving in the oleum spirits. This procedure facilitates admixture of the vulcanizer with the rubber-resin solution.

The vulcanizer solution is mixed in with the rubber-resin solution just prior to use of the latter for the paper treatment, as the composite starts to gel within a few hours, even at room temperature.

A 38 lb. per ream saturating type paper may be used, for example, such as a porous size-free long-fibred rope paper. The paper is saturated with the impregnating solution and passed through squeeze rolls to remove excess, avoiding a surface layer of impregnant and thereby facilitating mechanical anchorage of such further coatings as may be applied. The paper is then festooned on racks and put through a drying oven to remove the solvent and vulcanize the rubber. An oven treatment involving 12 hours at 170° F. gives good results. This paper treatment results in a waterproof, unified product having an excellent aging life and the tensile strength of the paper is increased. Vulcanization is not sufficient to build up elasticity and the paper has a dead-stretch. The use of this type of backing permits of making reflector sheets which can be conformed to sign embossings. This sheet material provides the backing 10 of the Fig. 1 construction.

The backing is then coated on one face to provide the reflector layer or surface 11, using 25-30 grains per 24 sq. in. of the following:

| | |
|---|---|
| Cellosolve (ethyleneglycol monoethylether) | 90 |
| Butvar (polyvinyl butyral) | 10 |
| Titinox (titanium dioxide pigment) | 20 |

The coated backing is dried for one hour at 175° F.

The resultant sheeting may then be processed using the system shown in Figs. 7 and 8. The composition of the solution used for providing the transparent coatings in which the spacing elements and beads are embedded may be as follows:

| | |
|---|---|
| "Rezyl 53" | 200 |
| "Beetle 227-8" | 100 |
| Hydrosolvent No. 2 | 15 |

The "Rezyl 53" is a liquid alkyd resin composition sold by American Cyanamid Co., composed of 65% of a two-component type alkyd resin and 35% of a plasticizer of the non-drying oil or non-drying fatty acid type. It is illustrative and may be replaced by a similar material. An illustrative alkyd resin is the well known kind made from phthalic anhydride and glycerine. Castor oil is illustrative of non-drying oils and ricinoleic acid is the acid which can be derived therefrom as for example by heating together the glycerine and castor oil before adding the phthalic anhydride.

The "Beetle 227-8" is a 50% solution of urea-formaldehyde resin in a solvent composed of 60 parts butyl alcohol and 40% xylol, and is also sold by American Cyanamid Co. It is a thermosetting resin and causes the coating to set up at moderate temperatures, even though the Rezyl does not fully set up (serving partly as a plasticizer).

As the foregoing classes of materials are well known in the synthetic resin art, further elaboration is believed unnecessary.

The Hydrosolvent No. 2 is a volatile petroleum solvent which is aromatic in character, being obtained from stocks which are rich in aromatic hydrocarbons. It can be substituted for benzol or toluol or mixtures thereof.

The reflector surface is coated with about 8 grains per 24 sq. in. of the aforesaid solution, over which is applied "grit 150" glass cullet of 1.53 index to give a glass coating weight of about 22-24 grains per 24 sq. in., followed by drying for 20 minutes at 150° F. (see Fig. 7).

There is next applied a coating of about 16-18 grains per 24 sq. in. of the aforesaid solution, over which is applied "No. 10" glass beads of 1.53 index to give a bead coating weight of about 50-55 grains per 24 sq. in., followed by curing at 175° F. for 20-30 hours (see Fig. 8). This results in the structure shown in Fig. 1.

The resin coatings, forming the flexible transparent matrix in which the cullet and beads are held, have an index of refraction of 1.529, thus being substantially identical with that of the cullet and beads, so that substantially no scattering of light occurs between the outer lens surfaces of the beads and the reflector surface.

*Example 2*

The construction is generally the same as in the foregoing example except that a silver type reflector is used to give a curve III type of reflex reflection.

The rubber-resin treated paper backing sheet is first given a coating to seal the surface pores and provide a smooth base surface for the reflector layer proper. The sealing composition is composed of:

| | |
|---|---|
| Butvar | 15 |
| Cellosolve | 135 |
| Aluminum flake lining or bronzing powder | 7½ |

An application of about 10 grains per 24 sq. in. should suffice, and the coating may be dried at 175° F. for one-half to one hour.

The following varnish base may be used for the reflector layer coating which is to be applied thereover:

| | |
|---|---|
| Tung oil | 90.0 |
| Linseed oil | 30.0 |
| Ester gum (low-acid type) | 12.5 |
| W. W. gum rosin | 12.5 |
| "Paranol No. 1—Hard" (Paramet Chemical Corp.) | 37.5 |
| (a modified phenol-aldehyde resin having a melting point of 250-260° F. and an acid number of 12-16). | |
| Red lead | 1.1 |
| Cobalt linoleate | 0.5 |
| Powdered manganese oxide | 0.01 |
| Petroleum spirits thinner | 190.0 |

These ingredients are combined and cooked to varnish consistency. To 150 parts of this varnish base there is stirred in 15 parts of finely divided aluminum flakes (such as XD No. 30 aluminum lining powder, sold by Reynolds Metal Co.). This coating composition should be made up fresh just before use.

Approximately 7.5-8.5 grains per 24 sq. in. is applied over the sealing coat, followed by drying for one-half hour at 140° F. and one hour at 175° F. The aluminum flakes lie approximately flat at the surface.

The remaining procedure is as shown in Figs. 7 and 8 and is explained in the previous example. The resultant structure gives a curve III type of reflex reflection.

*Example 3*

This example illustrates the use of a metal reflector surface which approaches the specular type more closely still than in the preceding example, and also illustrates the use of organic glass beads and spacing elements in a Fig. 2 type of construction.

A soft and pliable aluminum foil having a smooth surface, which may be laminated to a backing or support, is coated with 10–12 grains per 24 sq. in. of a 50% solution of n-butyl-methacrylate in Hydrosolvent No. 2, upon which is applied a layer of methyl methacrylate resin beads of approximately 2.5–3.0 mils diameter in amount weighing about 22 grains per 24 sq. in., followed by air drying. These beads form the spacing elements (16 in Fig. 2).

The n-butyl-methacrylate resin is transparent, has a density of 1.05 at 25° C., a molecular weight such that a 50% solution in toluol has a viscosity of 80 poises, and has a refractive index of 1.483.

The methyl methacrylate of which the beads are made is transparent, has a density of 1.19 at 25° C., a "Pfund" hardness at 25° C. of 220 grams, a molecular weight such that a 20% solution in toluol has a viscosity of 148 poises, and has a refractive index of 1.490.

There is next applied, over the spacing beads, a further coating of the n-butyl-methacrylate solution, amounting to about 20 grains per 24 sq. in., followed by a layer of "No. 10" size methyl methacrylate beads having a weight of about 41 grains per 24 sq. in. Heating for four hours at 175° F. serves for drying. The lens beads, spacing beads, and bonding resin, all have approximately the same index of refraction, as shown by the foregoing data.

All of the foregoing coating compositions are of the "air-drying type," by which it is meant that the wet coating will dry (including curing where resin advance is involved) at room temperature or at moderately elevated temperature, so that temperatures below 250° F. can be employed. This is to be contrasted with coatings and enamels which must be baked at high temperatures in order to be properly cured. The air-drying type is highly advantageous for most backings of the flexible sheet type, in order to avoid the destructive action of high temperatures and to facilitate manufacture. Furthermore, the drying action continues after manufacture and results in progressive curing which tends to offset the action of outdoor exposure which would otherwise cause deterioration. However, coatings of a type requiring high-temperature baking can of course be used where the nature of the backing permits, as is the case of metal backing.

In referring broadly to the reflex reflector sheet as being "flexible," it is meant that the sheeting can be wound upon cores of about 18-inch diameter or less and unwound to flat form without damage. All of the examples relate to preferred forms which can be wound upon 3-inch diameter cores.

With reference to the term "weatherproof" as applied to the reflex reflector sheet and to the exposed bead-bonding coat, it is unfortunate that a specification or criterion cannot be given in terms of accurately controlled accelerated weathering tests, or other tests, performed in a laboratory. A great deal of work has been done in attempting to devise a criterion of this kind, but without success in finding one that closely correlates with the results of outdoor exposure, owing to the combined action of many factors at work in actual weathering. Laboratory tests (such as exposure in a "Weatherometer") serve to weed out reflector sheets which are obviously unsuitable and give some indication as to those which receive a high rating, and are useful for control purposes, but that is about all that can be said in the present state of development.

Actual outdoor exposure tests provide the only safe criterion in evaluating reflex reflectors embodying different types of coating materials. Outdoor exposure at Houston, Texas, U. S. A., has thus far provided the best criterion and the basis for setting up standards. This location is used for this purpose by a number of concerns (such as roofing companies). It has been found that reflex reflector sheets suffer greater weathering per year cycle at Houston than at St. Paul, Minnesota, and hence the results at Houston may be safely accepted as providing a general criterion, in view of the severity and wide variety of weathering conditions encountered at these two places.

For the purpose of this specification and claims, the term "weatherproof," as applied to the bonding coat and to the reflex reflector sheet as a whole, is defined as meaning that the reflux reflector sheet will stand at least a full year at Houston (in vertical position facing south) without suffering over 25% loss of beads, and without suffering such discoloration as will cause a loss of brilliancy of more than 25%. Ratings have also been made with reflectors facing south with a 45° inclination, but in some cases spurious results have been obtained as to the effect of sun-darkening, since in practice signs are ordinarily placed vertically and darkening due to rays brought to focus from the sun may not adversely affect portions of the coating which actually transmit light from automobile headlights. On either basis, reflex reflector sheeting made in accordance with the examples herein set forth, have passed the test by a wide margin. In fact test sheets of different construction but using the same types of bonding materials, have stood exposure at St. Paul for two years and more without appreciable indication of bead loss or other deterioration, and there has not been time to determine what the useful life really is that can be obtained.

As a comparison, samples of all of the various brands of glass bead type moving picture screens which could be found on the market were exposed in the same places (St. Paul and Houston) and beginning at the same time. These quickly failed and at the end of a year showed total (or 99 plus percent) bead loss and the bonding coat in each instance had either completely disappeared or was so badly chalked and deteriorated as to be useless.

It will be apparent that the development of a high brilliancy flexible reflex reflector sheet, which can be ground out by the mile in continuous uniform fashion and supplied to users in roll form, and can be readily cut to shape with shears or simple die cutters (by hand or machine) and affixed to any desired base, to provide weatherproof outdoor signs, constitutes an important advance in the art, and in the field of making highways safer.

Having described various embodiments of my invention, but without intent to be limited thereto, what I claim is as follows:

1. A reflex light reflector comprising a light-returning layer of small transparent spheres providing a multiplicity of contiguous convex lens elements, an underlying reflector spaced from said spheres, an interposed layer of transparent spacing elements of smaller dimension than said spheres, and a transparent matrix in which said spacing elements are embedded and in which said spheres are partially embedded, said matrix and said spacing elements constituting a transparent solid medium between said spheres and said reflector.

2. A reflex light reflector comprising a light-returning layer of small transparent glass beads providing a multiplicity of contiguous convex lens elements, an underlying reflector having a non-specular reflecting surface spaced from said beads, an interposed layer of transparent glass spacing elements of smaller dimension than said beads, and a transparent matrix in which said spacing elements are embedded and in which said beads are partially embedded, said matrix and said spacing elements having substantially the same refractive index and constituting a transparent solid medium between said beads and said reflecting surface.

3. A reflex light reflector according to claim 2 in which said beads are spaced from said reflecting surface by a distance of the order of one-third the bead diameter, and the beads, matrix and spacing elements all have a refractive index of about 1.50–1.55.

4. A reflex light reflector comprising a light-returning layer of small transparent glass beads providing a multiplicity of contiguous convex lens elements, an underlying reflector spaced from said beads, an interposed spacing layer of transparent glass cullet particles of smaller dimension than said beads and serving to provide positive mechanical spacing of the beads from the reflector of predetermined magnitude, and a transparent matrix in which said cullet particles are embedded and in which said beads are partially embedded, said matrix and particles having substantially the same refractive index and constituting a transparent solid medium between said beads and said reflector.

5. A reflex light reflector having a flat reflector, a light-returning layer formed of a multiplicity of small spherical lens elements of different sizes overlying and selectively spaced from the reflector in accordance with individual size so as to minimize the average deviation from the spacing factor needed for high-brilliancy, and transparent holding means for maintaining the lens elements in spaced position.

6. A reflex light reflector comprising a light-returning layer of small transparent graded spheres of various diameters, an underlying reflector spaced therefrom, said spheres being selectively spaced from the reflector in proportion to their individual diameters to cause high-brilliancy reflex reflection, and a transparent spacing and binding medium holding said spheres in the spaced relation, the outer portions of the spheres providing a multiplicity of contiguous convex lens elements.

7. A reflex light reflector comprising a light-returning layer of small transparent graded glass beads of various diameters, an underlying reflector spaced therefrom, an interposed spacing layer of small graded transparent glass elements of smaller dimension than said beads, said beads being nested against said spacing layer elements so as to be selectively spaced from said reflector in proportion to individual diameters to minimize the average deviation from a predetermined spacing factor and produce high-brilliancy, and a transparent matrix covering said spacing layer elements and in which said beads are partially embedded, the matrix having substantially the same refractive index as said spacing layer elements.

8. A reflex light reflector according to claim 7 in which the average spacing of the beads from the reflector is of the order of one-third the average bead diameter, and the beads, matrix and spacing elements all have a refractive index of about 1.50–1.55.

9. A reflex light reflector comprising a light-returning layer of small transparent graded glass beads of various diameters, an underlying reflector having a non-specular reflecting surface spaced therefrom, an interposed spacing layer of small graded transparent glass cullet particles of smaller dimension than said beads, said beads being nested against said cullet particles so as to be selectively spaced in accordance with individual bead diameters, approaching a uniform spacing-to-diameter ratio in a statistical sense, with the ratio being such as to provide substantially optimum brilliancy, and a transparent matrix covering said cullet particles and in which said beads are partially embedded, the matrix having substantially the same refractive index as said cullet particles.

10. Flexible reflex reflector sheet material adapted to be wound in roll form and manufactured in continuous web fashion, comprising a flexible sheet backing having a non-specular light-reflecting surface, a light-returning layer of small transparent spheres overlying and spaced from said light-reflecting surface, an interposed layer of transparent elements of smaller dimension than said spheres serving to mechanically space said spheres from said light-reflecting surface in a statistically uniform fashion providing substantially uniform brilliancy from area to area, a flexible transparent matrix in which the spacing elements are embedded and in which the spheres are partially embedded and providing in combination with the spacing elements a substantially non-scattering light-transmitting solid medium between the spheres and the reflecting surface.

11. A weatherproof reflex reflector adapted for use in outdoor signs, including a layer of small transparent glass spheres providing a multiplicity of contiguous convex lens elements, an underlying reflector, an interposed layer of transparent spacing elements of dimension smaller than said spheres and serving to space the spheres from the reflector, and a transparent weatherproof resin-base binder having substantially the same refractive index as said spacing elements and in combination with the latter providing a transparent medium between the spheres and the reflector.

12. A weatherproof flexible reflex reflector sheet material, adapted to be wound in roll form and to be readily cut in the making of signs, comprising a waterproof flexible sheet backing, a reflector layer united to one surface thereof, an overlying light-returning layer of transparent graded glass beads providing a multiplicity of contiguous convex lens elements, said beads having an average diameter not exceeding about 10 mils, an interposed layer of small transparent glass spacing elements serving to mechanically space said bead layer from said reflector layer so that the beads are substantially uniformly spaced in a statistical sense, and a flexible weatherproof transparent resin-base matrix in which the spacing elements are embedded and the beads are partially embedded, the matrix and the spacing elements forming a transparent solid medium between the beads and the reflector.

13. In a sign adapted for outdoor highway use, a reflex light reflecting area comprised of a light-returning layer of small transparent glass beads providing a multiplicity of contiguous convex lens elements, an underlying reflector, an interposed layer of transparent glass spacing elements of dimension smaller than the beads serving to mechanically space the beads from the reflector in predetermined fashion adapted to cause high-brilliancy, and a transparent weatherproof binder in which said spacing elements are embedded and in which said beads are partially embedded and having substantially the same refractive index as the spacing elements.

14. In a sign adapted for outdoor highway use, a reflex light reflecting area comprised of a waterproof sheet backing united to the base of the sign, a reflector layer united to the outer face of said backing, a light-returning layer of small transparent glass beads overlying and spaced from the reflector, a transparent weatherproof binder in which the beads are partially embedded and held in spaced relation, and a layer of transparent spacing elements having substantially the same refractive index as the binder and embedded therein between the beads and the reflector, the spacing of the beads being such as to produce higher brilliancy than if no spacing were employed.

15. In a method of making a reflex reflector, the steps of applying a coating of transparent liquid binder to a reflector surface, applying thereto a layer of small transparent graded spacing elements which become partially embedded and sink into contact with the reflector surface, the binder being of thickness such that a single thickness of the elements become embedded, removing surplus elements, applying a second coating of transparent liquid binder over the layer of spacing elements, applying a layer of small transparent graded spheres which sink into the binder and nest in contact with the spacing elements, the binder being of thickness to leave a single thickness of the spheres partially exposed, removing surplus spheres, and drying; the liquid binder being of a character which dries to solid transparent form having a refractive index substantially the same as the spacing elements and the latter being of dimension smaller than said spheres.

PHILIP V. PALMQUIST.